United States Patent
Harris et al.

(10) Patent No.: US 11,821,570 B2
(45) Date of Patent: Nov. 21, 2023

(54) MOUNT FOR ADJUSTING A MOUNTING PLANE

(71) Applicant: BAE SYSTEMS plc, London (GB)

(72) Inventors: Samuel William Harris, Rochester (GB); Russell Christopher West, Rochester (GB); Martyn Ingleton, Rochester (GB)

(73) Assignee: BAE SYSTEMS PLC, London (GB)

( * ) Notice: Subject to any disclaimer, the term of this patent is extended or adjusted under 35 U.S.C. 154(b) by 192 days.

(21) Appl. No.: 17/594,122

(22) PCT Filed: Mar. 18, 2020

(86) PCT No.: PCT/GB2020/050690
§ 371 (c)(1),
(2) Date: Oct. 4, 2021

(87) PCT Pub. No.: WO2020/208335
PCT Pub. Date: Oct. 15, 2020

(65) Prior Publication Data
US 2022/0154875 A1    May 19, 2022

(30) Foreign Application Priority Data

Apr. 9, 2019 (EP) .................................... 19275049
Apr. 9, 2019 (GB) .................................... 1904983

(51) Int. Cl.
*F16M 11/04* (2006.01)
*F16M 11/14* (2006.01)
(Continued)

(52) U.S. Cl.
CPC .......... *F16M 11/043* (2013.01); *F16M 11/14* (2013.01); *F16M 13/022* (2013.01);
(Continued)

(58) Field of Classification Search
CPC .... F16M 11/043; F16M 11/14; F16M 13/022; F16M 2200/041; F16M 2200/047; G02B 27/0176; G02B 2027/0156
See application file for complete search history.

(56) References Cited

U.S. PATENT DOCUMENTS 3,814,365 A * 6/1974 Mackenzie .......... G02B 7/1825
248/278.1
4,763,991 A  8/1988 Klotz, Jr.
(Continued)

FOREIGN PATENT DOCUMENTS

CN     202533636 U    11/2012
CN     104656221 A     5/2015
(Continued)

OTHER PUBLICATIONS

GB Examination Report under Section 18(3) received for GB Application No. GB2003885.7, dated Oct. 19, 2021. 6 pages.
(Continued)

*Primary Examiner* — Monica E Millner
(74) *Attorney, Agent, or Firm* — Finch & Maloney PLLC

(57) ABSTRACT

A mount for adjusting a mounting plane is disclosed. The mount comprises a first adjustable device, a second adjustable device and a third adjustable device. A first intersection between the first adjustable device and the second adjustable device forming a first principal axis and a second intersection between the second adjustable device and the third adjustable device forming a second principal axis substantially perpendicular to the first principal axis. The first adjustable device, second adjustable device and third adjustable device rigidly coupled together. The first adjustable device is configurable to be adjusted in a first translational degree of freedom, and substantially constrain the first (Continued)

adjustable device in remaining translational degrees of freedom, wherein adjustment of the first adjustable device in the first translational degree of freedom causes a rotation of the mounting plane about the second principal axis. The second adjustable device is configurable to be adjusted in a second translational degree of freedom, and substantially constrain the second adjustable device in remaining translational degrees of freedom, wherein adjustment of the second adjustable device in the second translational degree of freedom causes a rotation of the mounting plane about a third principal axis, perpendicular to the first and second principal axis. The third adjustable device is configurable to be adjusted substantially in the first translational degree of freedom, and substantially constrain the third adjustable device in remaining translational degrees of freedom, wherein adjustment of the third adjustable device in the first translational degree of freedom causes a rotation of the mounting plane about the first principal axis. A first end of each adjustable device is configured to be fixed in location and a second end forms the mounting plane. Each adjustable device comprises a rotation device located between the first end and the second end of each adjustable device, the rotation device configured to allow the second end to rotate about three degrees of freedom.

20 Claims, 7 Drawing Sheets

(51) Int. Cl.
*F16M 13/02* (2006.01)
*G02B 27/01* (2006.01)
(52) U.S. Cl.
CPC ..... *G02B 27/0176* (2013.01); *G02B 27/0179* (2013.01); *F16M 2200/041* (2013.01); *F16M 2200/047* (2013.01); *G02B 2027/0156* (2013.01)

(56) References Cited

U.S. PATENT DOCUMENTS

| | | | | |
|---|---|---|---|---|
| 5,140,470 | A | | 8/1992 | Luecke |
| 6,016,230 | A | * | 1/2000 | Nunnally ............... G02B 7/004 359/822 |
| 6,304,393 | B1 | | 10/2001 | Sechrist et al. |
| 7,760,449 | B2 | * | 7/2010 | Theriault ............... G02B 7/004 359/811 |
| 7,982,980 | B2 | * | 7/2011 | Rigney ................. G02B 7/023 359/822 |
| 8,366,063 | B2 | * | 2/2013 | Cargo .................... F16M 11/12 248/397 |
| 9,933,613 | B2 | | 4/2018 | West |
| 10,465,726 | B2 | * | 11/2019 | Bullard ................... F16B 19/02 |
| 10,670,825 | B2 | * | 6/2020 | Foes ................ B29C 66/30321 |
| 10,996,419 | B2 | * | 5/2021 | Huang .................. G02B 7/005 |
| 2005/0001134 | A1 | | 1/2005 | Lin et al. |
| 2005/0163458 | A1 | | 7/2005 | Nunnally et al. |
| 2006/0081745 | A1 | | 4/2006 | Theriault et al. |
| 2012/0032055 | A1 | | 2/2012 | Cargo et al. |
| 2012/0168593 | A1 | | 7/2012 | Mekid et al. |
| 2018/0128303 | A1 | * | 5/2018 | Bullard ................... F16B 19/02 |
| 2018/0142830 | A1 | | 5/2018 | Bullard |

FOREIGN PATENT DOCUMENTS

| | | |
|---|---|---|
| EP | 2008140 A1 | 12/2008 |
| GB | 2538822 A | 11/2016 |
| WO | 2007123594 A1 | 11/2007 |
| WO | 2018228116 A1 | 12/2018 |
| WO | 2020208335 A1 | 10/2020 |

OTHER PUBLICATIONS

GB Search Report under Section 17(5)(a) received for GB Application No. GB2003885.7, dated Oct. 19, 2019. 6 pages.
International Preliminary Report on Patentability received for PCT Application No. PCT/GB2020/050690, dated Sep. 28, 2021. 8 pages.
International Search Report and Written Opinion received for PCT Application No. PCT/GB2020/050690, dated May 29, 2020. 13 pages.
GB Search Report under Section 17(5) received for GB Application No. GB1904983.2, dated Oct. 1, 2019. 3 pages.
GB Combined Search and Examination Report under Sections 17 and 18(3) received for GB Application No. GB2003885.7, dated Sep. 1, 2020. 7 pages.
Extended European Search Report received for EP Application No. 19275049.5, dated Oct. 8, 2019. 8 pages.

* cited by examiner

MOUNT FOR ADJUSTING A MOUNTING PLANE

BACKGROUND

Mounts are used to adjust the position of various types of devices, such as optical devices.

DETAILED DESCRIPTION

Figure 1A:
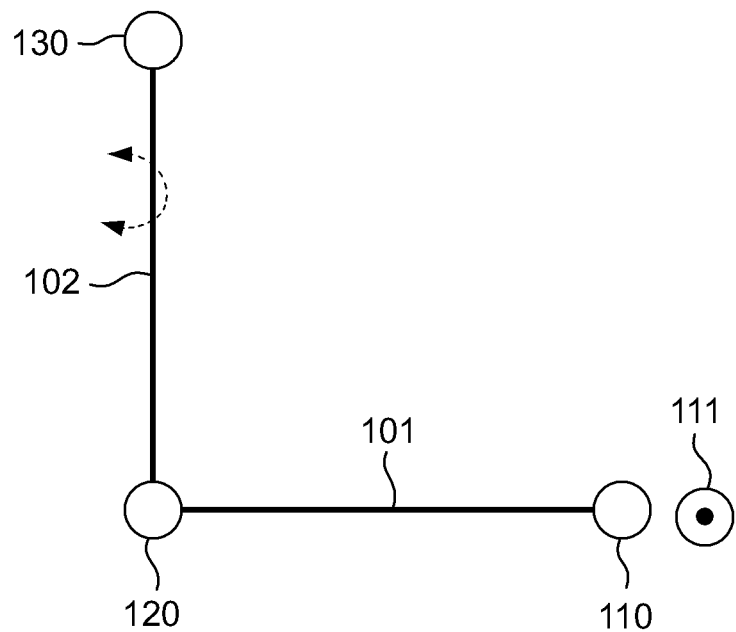
FIG. 1A illustrates a first view of a mount.
Figure 1B:
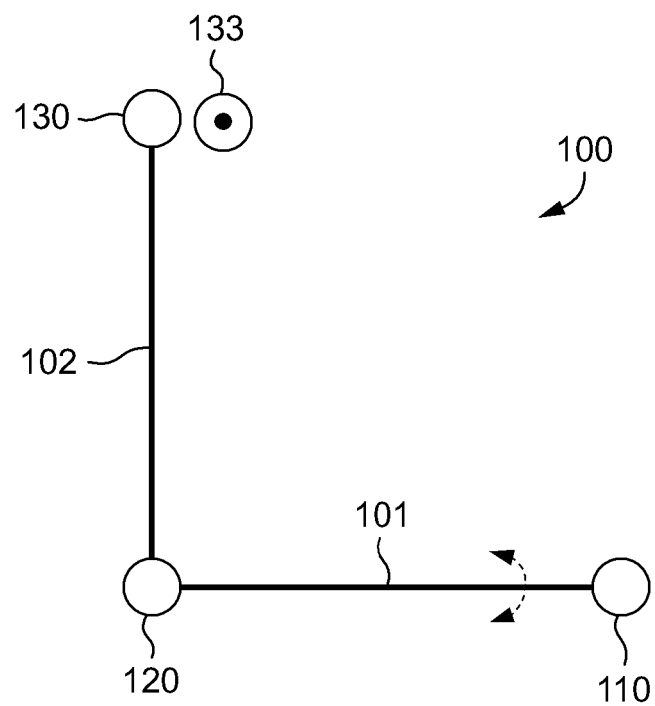
FIG. 1B illustrates a second view of a mount.
Figure 1C:
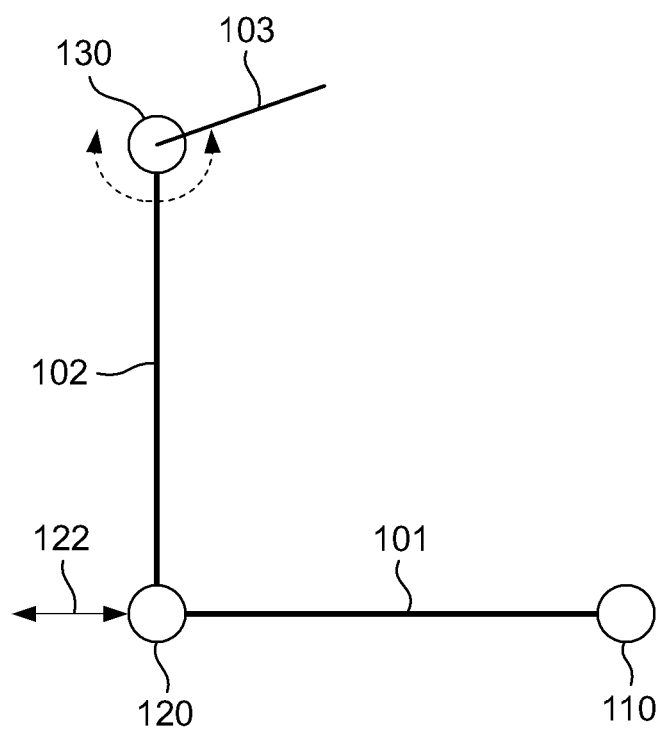
FIG. 1C illustrates a third view of mount.

FIGS. 1A-1C illustrate example views of rotation of mount 100. The figures are merely illustrative of the shape of the mount and are not to scale. FIGS. 1A-C illustrate mount 100 comprising a first adjustable device 110, a second adjustable device 120 and a third adjustable device 130. A first intersection between the first adjustable device 110 and the second adjustable device 120 forms a first principal axis 101. A second intersection between the second adjustable device 120 and the third adjustable device 130 forms a second principal axis 102. The second principal axis 102 is substantially perpendicular to the first principal axis 101. The first adjustable device 110, second adjustable device 120 and the third adjustable device are rigidly coupled together in substantially an L-shape. Although the intersections between the adjustable devices are illustrated as being straight lines, it is not necessary that the connections are straight. The connections may have any shape and still hold the adjustable devices substantially in an L-shape.

The mount 100 is used to adjust a mounting plane, by adjusting each of the first adjustable device 110, the second adjustable device 120 and the third adjustable device 130. The mounting plane may be substantially parallel to the plane formed by the first axis 101 and the second axis.

The first adjustable device 110 is configurable to be adjusted in a first translational degree of freedom providing a first linear adjustment 111 perpendicular to the plane of the drawing. The first adjustable device 110 is also configured to substantially constrain the first adjustable device 110 in remaining translational degrees of freedom in directions orthogonal to the first linear adjustment 111. The first linear adjustment 111 of the first adjustable device 110 causes a rotation of the mounting plane about the second principal axis 102 as illustrated in FIG. 1A.

The third adjustable device 130 is configurable to be adjusted substantially in the first translational degree of freedom providing a third linear adjustment 133 out of the plane of the drawing. The third adjustable device 130 is also configured to substantially constrain the third adjustable device 130 in remaining translational degrees of freedom in directions orthogonal to the third linear adjustment. The third linear adjustment 133 of the third adjustable device 130 causes a rotation of the mounting plane about the first principal axis 101 as illustrated in FIG. 1B.

The first translational degree of freedom of the first adjustable device 110 is in the same direction as the first translational degree of freedom of the third adjustable device 130, i.e. in the direction of the third principal axis 103 (not shown in FIGS. 1A and 1B). The second translational degree of freedom is perpendicular to the first translational degree of freedom and also in the plane formed by the first principal axis 101 and the second principal axis 102.

The second adjustable device 120 is configured to be adjusted in a second translational degree of freedom providing a second linear adjustment 122. The second adjustable device 120 is also configured to substantially constrain the second adjustable device 120 in remaining translational degrees of freedom in directions orthogonal to the second linear adjustment 122. The second linear adjustment 122 of the second adjustable device 120 causes a rotation of the mounting plane about the third principal axis 103 as illustrated in FIG. 1C. Third principal axis 103 is perpendicular to first principal axis 101 and second principal axis 102.

It is also possible that adjustment of the second adjustable device 120 causes a rotation about the first adjustable device 110 if the adjustment is parallel to second principal axis 102 rather than being parallel to the first principle axis 101.

The adjustment of the first adjustable device 110, second adjustable device 120, and the third adjustable device 130 may be such that a dimension of the adjustable device changes. In some examples the adjustment may be enabled by a linear translational device. The linear adjustment device may comprise at least one of a screw jack, a pitched thread, an eccentric axle, a slider, a rack and pinion, and a servo/solenoid, however it is not limited to the aforementioned examples, and any suitable mechanism may be used to adjust the device in a single dimension. In some examples the adjustment device may be adjusted only in substantially a single dimension at a time.

The mount 100 is illustrated as being L-shaped, however it is noted that the shape may be substantially L-shaped, such that the angle formed by the first axis 101 and the second axis 102 is not exactly 90°. Deviation from the angle being 90° leads to cross coupling between adjustments, but the amount of cross coupling, and therefore the deviation from 90°, may be acceptable depending on the application of the mount.

Figure 2:
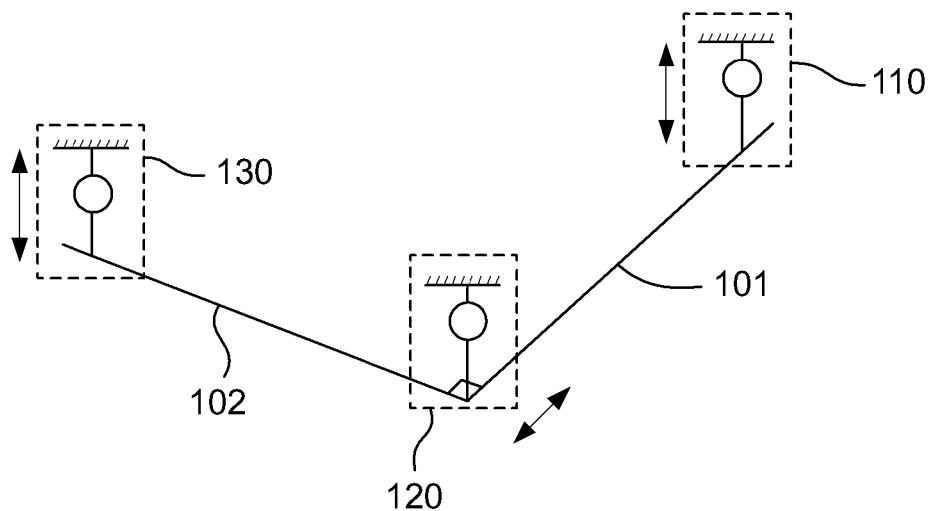
FIG. 2 illustrates a perspective view of a mount.

FIG. 2 illustrates a perspective view of the mount 100 according to some examples. FIG. 2 additionally shows a schematic view of each of the first adjustable device 110, second adjustable device 120 and third adjustable device 130. Each adjustable device comprises a first end and a second end. Each adjustable device also comprises a rotation device located in a path between the first end and the second end. The mounting plane may be formed by the first ends, or may be formed by the second ends. The set of the first ends or the set of the second ends are configured to be fixed. The first ends and the second ends are not required to be located at the ends of the adjustable devices. The rotation device of each of the first adjustable device 110, second adjustable device 120 and third adjustable device 130 allows the first end of each adjustable device to rotate in three dimensions about the second end (or vice versa, depending upon which end is fixed).

Figure 3:
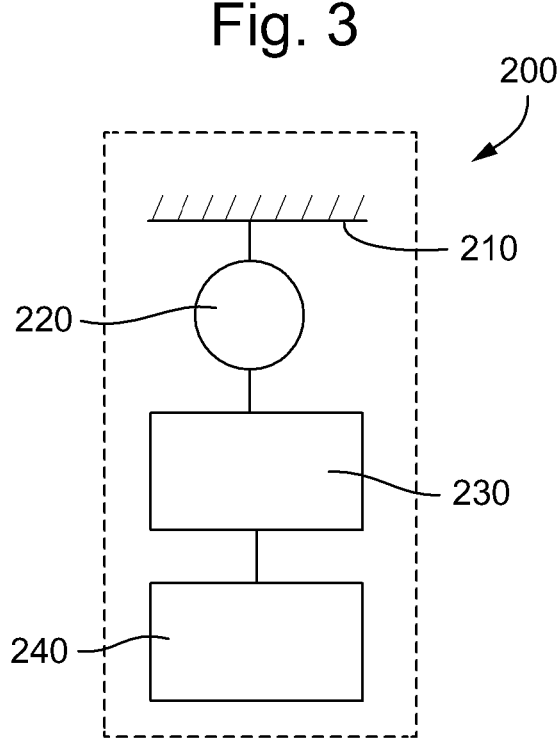
FIG. 3 illustrates an adjustable device of a mount.

FIG. 3 illustrates an adjustable device 200 in accordance with some examples. The adjustable device 200 is a generic example of the first adjustable device 110, second adjustable device 120 and third adjustable device 130. Each of the first adjustable device 110, second adjustable device 120 and third adjustable device 130 may comprise similar features to the adjustable device 200. The adjustable device 200 comprises a first end 210, a rotation device 220, adjustment means 230 and a second end 240. In some examples the mount 100 may comprise three adjustable devices 200.

First end 210 may be configured to be fixed in location. Second end 240 may form the mounting plane that a device may be mounted onto. However, alternatively second end 240 may be configured to be fixed in location and first end 210 may form the mounting plane that a device may be mounted onto Adjustment means 230 is configured to adjust the adjustment device 200 in one translational degree of freedom and substantially constrain the adjustment device in the remaining two translational degrees of freedom. In some examples the adjustment means 230 may be configured to change the permitted degree of freedom such that the adjustment means 230 may adjust the adjustment device independently in more than one translational degree of freedom. The translational degrees of freedom are orthogonal directions in space and are aligned or substantially aligned with the first principal axis 101, second principal axis 102, and third principal axis 103.

The rotation device 220 allows the first end 210 to rotate in three rotational degrees of freedom with respect to the second end 240 and/or the adjustment means 230. The rotational freedom of the adjustment device ensures, when the using three adjustment devices each comprising a rotation device that the adjustments do not conflict with each other. Without the rotation device an adjustment to one of the adjustment devices would have an effect on the other two adjustment devices, and therefore further adjustments would be needed to adjust the mount. This adds time for aligning devices, and is therefore inefficient.

In some examples the adjustment device 200 may also comprise locking means to lock the adjustment of the adjustment means 230 and/or the rotation of the rotation device 220. The locking means may comprise at least one of a locking screw, locking pin and a locking nut.

In some examples the adjustment device 200 may comprise a biasing means to provide a bias to the rotation device and prevent backlash.

The mount 100 may be used to adjust the azimuth, elevation and a roll of a device. The device may be an optical display, such as a head up display, however it is not limited to such optical devices. It is to be understood that the adjustment of the device depends on the initial orientation of the mount 100.

Figure 4:
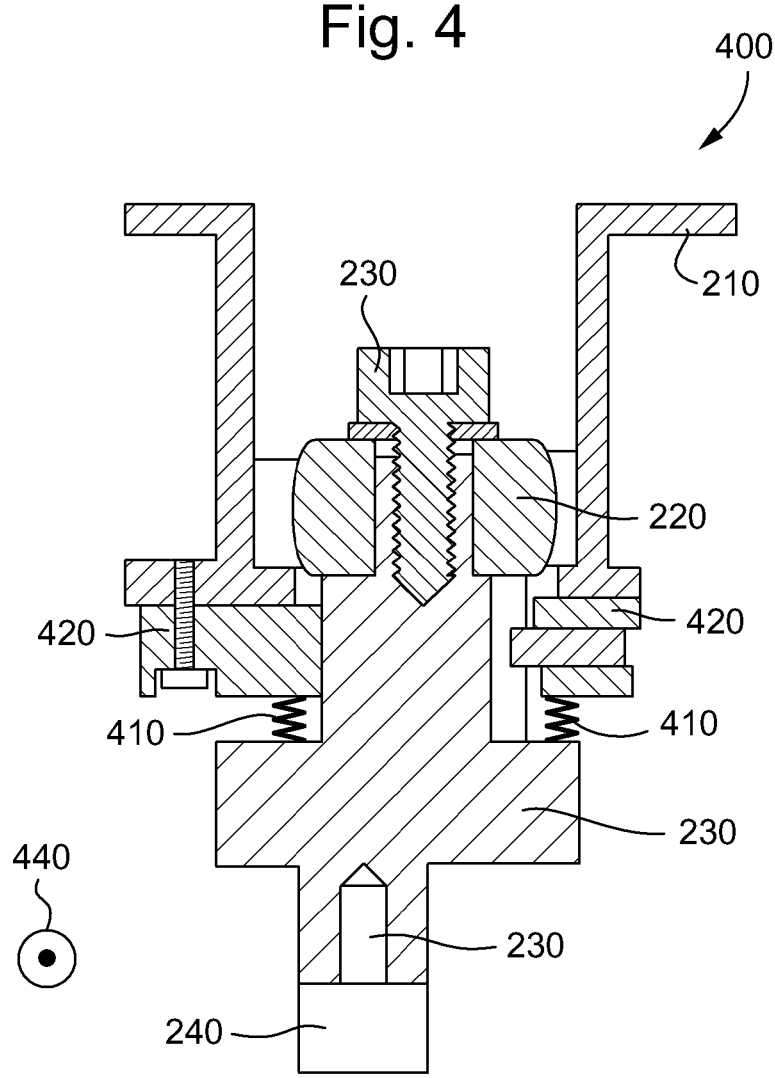
FIG. 4 illustrates an azimuth adjustable device.

FIG. 4 illustrates an example of an azimuth adjustment device 400. The azimuth adjustment device 400 is similar to the adjustment device 200, and similar features are labelled with corresponding reference signs from FIG. 3. Azimuth adjustment device 400 comprises a first end 210, a rotation device 220, adjustment means 230, a second end 240, biasing means 410, locking means 420. The first end 210 is configured to be mounted to a fixed position in space, such as a fixed position on a vehicle. The second end 240 may form the mounting plane of the device, such as an optical display.

The rotation device 220 allows for the end that is not fixed to rotate in three degrees of freedom. In some examples the rotation device 220 may comprise a spherical bearing. In some examples the rotation device 220 may comprise a spherical washer, ball and socket, gimbal, flexible mount and a stiff spring.

Adjustment means 230 comprises an eccentric pin that when adjusted adjusts the azimuth adjustment device 400 substantially in direction 440, perpendicular to the view (in/out of the page), as indicated in FIG. 4. Although an eccentric pin is shown in FIG. 4, any other suitable arrangement may be used to adjust the azimuth adjustment device.

Azimuth adjustment device 400 comprises a biasing element 410. Biasing element may comprise a spring. The biasing element is configured to provide a biasing force to the rotation device. The biasing device reduces, eliminates or substantially eliminates backlash on the mount when adjusting the azimuth adjustment device 400. The biasing device may also centralise the rotation.

Azimuth adjustment device 400 comprises a locking means 420. Locking means 420 may lock the position of the azimuth adjustment device 400. The locking means 420 may comprise any suitable device, such as a locking screw or a locking nut, or a dowel.

Figure 5:
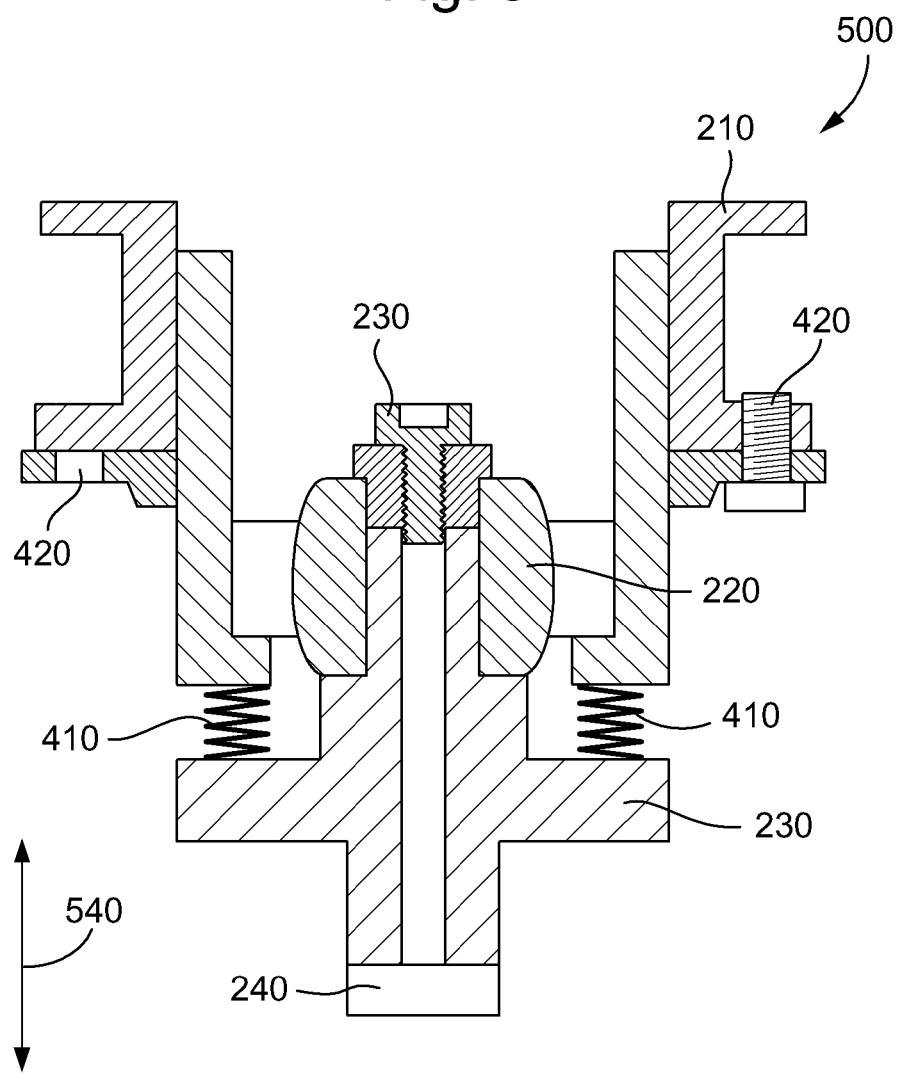
FIG. 5 illustrates an elevation adjustable device.

FIG. 5 illustrates an example of an elevation adjustment device 500, however a similar or identical device may also be used to adjust roll of the mounted device. The elevation adjustment device 500 is similar to the adjustment device 200 and azimuth adjustment device 400, and similar features are labelled with corresponding reference signs from FIG. 3 and FIG. 4. Elevation adjustment device 500 comprises a first end 210, a rotation device 220, adjustment means 230, a second end 240, biasing means 410 and locking means 420. The first end 210 is configured to be mounted to a fixed position in space, such as a fixed position on a vehicle. The second end 240 may form the mounting plane of an optical display.

The rotation device 220 allows for the end that is not fixed to rotate in three degrees of freedom. In some examples the rotation device 220 may comprise a spherical bearing. In some examples the rotation device 220 may comprise a spherical washer, ball and socket, gimbal, flexible mount and a stiff spring.

Adjustment means 230 comprises a linear screw that when adjusted adjusts the elevation adjustment device 500 substantially in direction 540, as indicated in FIG. 5. Although a linear screw is shown in FIG. 5, any other suitable arrangement may be used to adjust the elevation adjustment device.

Elevation adjustment device 500 comprises a biasing element 410. Biasing element may comprise a spring. The biasing element is configured to provide a bias to the rotation device 220. The biasing device reduces, eliminates or substantially eliminates backlash on the mount when adjusting the elevation adjustment device 500. The biasing device may also centralise the rotation.

Elevation adjustment device 500 comprises a locking means 420. Locking means 420 may lock the position of the elevation adjustment device 500. The locking means 420 may comprise any suitable device, such as a locking screw, dowel or a locking nut.

FIGS. 4 and 5 illustrate the second end 240 as being located on the end of the azimuth adjustment device 400 and the elevation adjustment device 500, however it should be understood that the second end 240 is illustrative and that the device may be mounted at any suitable position or positions on the azimuth adjustment device 400 and the elevation adjustment device 500.

Figure 6:
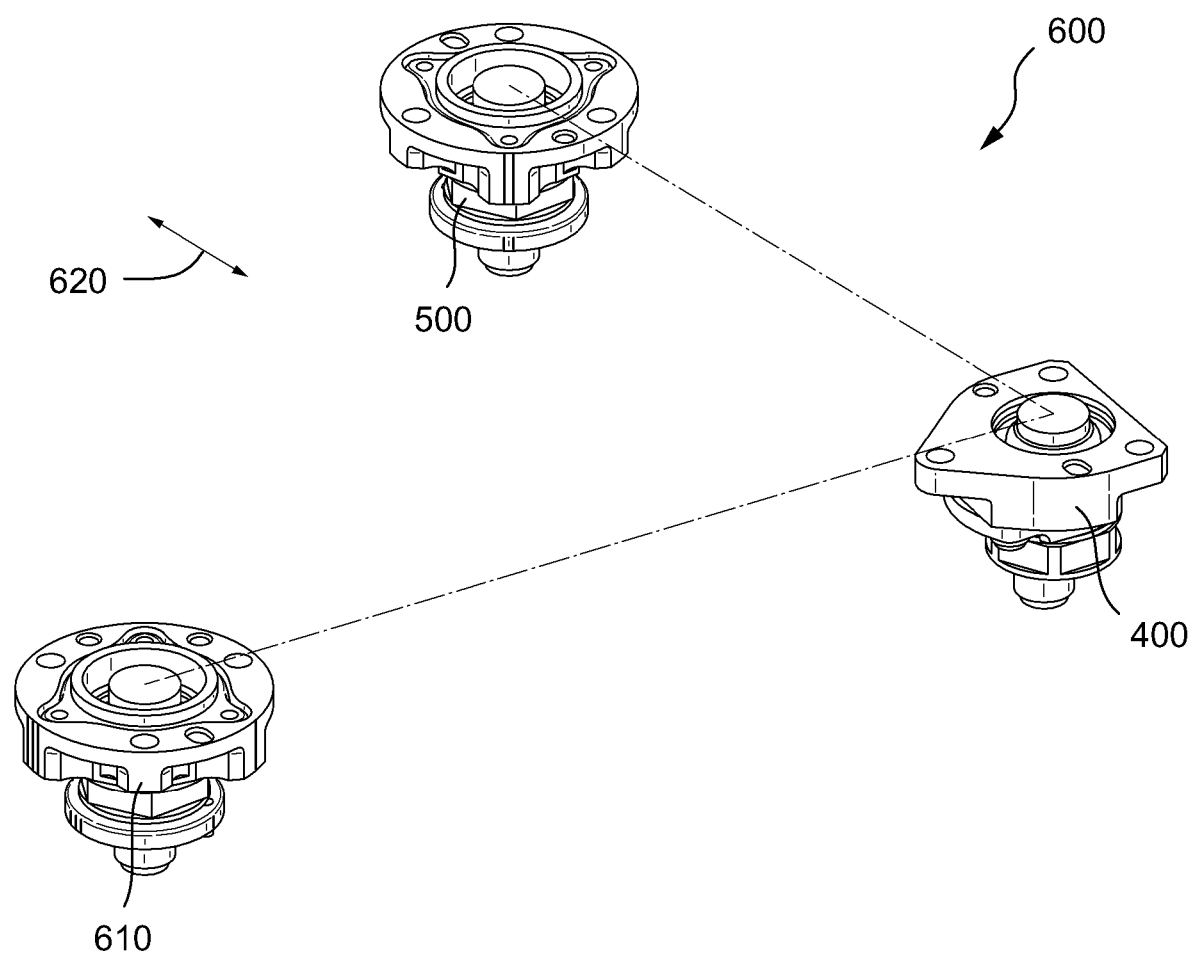
FIG. 6 illustrates a mount to adjust azimuth, roll and elevation.

FIG. 6 illustrates an adjustable mount 600 to adjust azimuth, roll and elevation of a device mounted to the adjustable mount 600. The mount 600 is similar to the mount 100 described with reference to FIGS. 1A-C and FIG. 2. Adjustable mount 600 comprises an azimuth adjustment device 400, an elevation adjustment device 500, and a roll adjustment device 610. Roll adjustment device 610 may be identical to or substantially similar to elevation adjustment device 500. Arrow 620 indicates the direction of the front of the device to be mounted to the adjustable mount 600.

Figure 7:
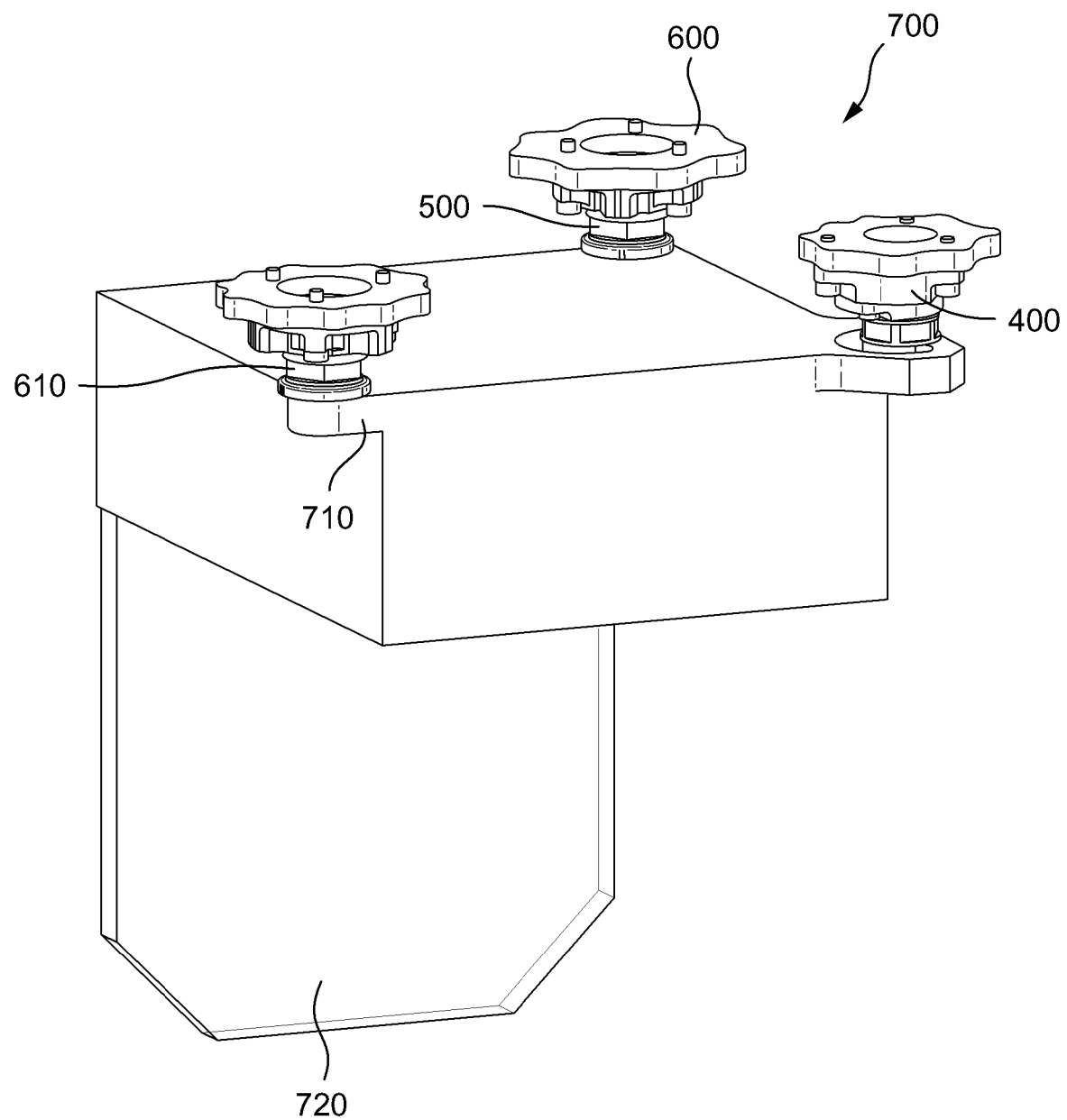
FIG. 7 illustrates a mount in an arrangement.

FIG. 7 illustrates an example arrangement 700 according to some examples. The example arrangement 700 comprises an adjustable mount 600 comprising an azimuth adjustment device 400, an elevation device 500, and a roll adjustment device 610. The ends of the adjustable mount 600 are mounted to a mounting plate 710. The optical device 720 may be attached to the mounting plate.

The arrangement 700 provides flexibility as once the optical device 720 is aligned and each of the azimuth adjustment device 400, the elevation adjustment device 500, and the roll adjustment device 610 are locked, then any optical device 720 and/or mounting plate 710 may be removed and replaced without the need to repeat the alignment.

In some examples the optical device 720 may be a heads up display, or any other sort of optical display. In some examples the mounting plate 710 may be integrated with the optical device 720 or may be separate to the optical device 720.

In some examples the arrangement 700 may be located in a vehicle such as an aircraft. In some examples the first principal axis 101 and second principal axis 102 may be aligned or substantially aligned with principal axes of the vehicle. This reduces cross-coupling of adjustments made to the arrangement 700.

The arrangement 700 is not limited to adjusting the alignment of an optical device 720, and an optical device 720 is merely an example of a device that may be aligned.

The invention claimed is:

1. A mount for adjusting a mounting plane, the mount comprising:
   a first adjustable device, a second adjustable device and a third adjustable device, a first connection between the first adjustable device and the second adjustable device forming a first principal axis, and a second connection between the second adjustable device and the third adjustable device forming a second principal axis substantially perpendicular to the first principal axis;
   the second adjustable device being rigidly coupled to one or both the first adjustable device and third adjustable device;
   the first adjustable device configurable to be adjusted in a first translational degree of freedom, and substantially constrain the first adjustable device in remaining translational degrees of freedom, wherein adjustment of the first adjustable device in the first translational degree of freedom causes a rotation of the mounting plane about the second principal axis;
   the second adjustable device configurable to be adjusted in a second translational degree of freedom, and substantially constrain the second adjustable device in remaining translational degrees of freedom, wherein adjustment of the second adjustable device in the second translational degree of freedom causes a rotation of the mounting plane about a third principal axis, substantially perpendicular to the first and second principal axis;
   the third adjustable device configurable to be adjusted substantially in the first translational degree of freedom, and substantially constrain the third adjustable device in remaining translational degrees of freedom, wherein adjustment of the third adjustable device in the first translational degree of freedom causes a rotation of the mounting plane about the first principal axis;
   a first end of each adjustable device configured to be fixed in location and a second end forming the mounting plane;
   each of the first adjustable device, second adjustable device and third adjustable device comprise a rotation device located between the first end and the second end of each adjustable device, the rotation device configured to allow the second end of each of the first adjustable device, second adjustable device and third adjustable device to rotate about three degrees of freedom with respect to each first end of the first adjustable device, second adjustable device and third adjustable device.

2. The mount according to claim 1, wherein the rotation device comprises a substantially spherical bearing.

3. The mount according to claim 1, wherein at least one of the first, second or third adjustment device comprises a linear translational device.

4. The mount according to claim 3, wherein the linear translational device comprises a screw jack, a pitched thread, an eccentric axle, a slider, a rack and pinion, a servo, a solenoid, or a combination of these.

5. The mount according to claim 1, comprising a biasing device to provide a biasing force to one of the rotation devices in the corresponding axis of the device adjustment.

6. The mount according to claim 5, wherein the biasing device comprises a spring.

7. The mount according to claim 1, wherein the first and third adjustable devices each comprises a fine pitched thread and the adjustable device of the second adjustable device comprises an eccentric pin.

8. The mount according to claim 1, wherein the mount is for adjusting the mounting plane of a head up display in a vehicle, and each first end is configured to be mounted to the vehicle.

9. The mount according to claim 8, wherein the first principal axis is substantially aligned with a first principal axis of the vehicle, and the second principal axis is substantially aligned with a second principal axis of the vehicle.

10. The mount according to claim 8, wherein the vehicle is an aircraft.

11. A vehicle comprising the mount of claim 1.

12. The vehicle according to claim 11, wherein the vehicle is an aircraft.

13. A mount for adjusting a mounting plane, the mount comprising:
    a first adjustable device, a second adjustable device and a third adjustable device, a first connection between the first adjustable device and the second adjustable device forming a first principal axis, and a second connection between the second adjustable device and the third adjustable device forming a second principal axis substantially perpendicular to the first principal axis;
    the second adjustable device being rigidly coupled to one or both the first adjustable device and third adjustable device;
    the first adjustable device configurable to be adjusted in a first translational degree of freedom, and substantially constrain the first adjustable device in remaining translational degrees of freedom, wherein adjustment of the first adjustable device in the first translational degree of freedom causes a rotation of the mounting plane about the second principal axis;
    the second adjustable device configurable to be adjusted in a second translational degree of freedom, and substantially constrain the second adjustable device in remaining translational degrees of freedom, wherein adjustment of the second adjustable device in the second translational degree of freedom causes a rotation of the mounting plane about a third principal axis, substantially perpendicular to the first and second principal axis;

the third adjustable device configurable to be adjusted substantially in the first translational degree of freedom, and substantially constrain the third adjustable device in remaining translational degrees of freedom, wherein adjustment of the third adjustable device in the first translational degree of freedom causes a rotation of the mounting plane about the first principal axis;

a first end of each adjustable device configured to be fixed in location and a second end forming the mounting plane;

each of the first adjustable device, second adjustable device and third adjustable device comprise a rotation device, each rotation device located between the first end and the second end of the corresponding adjustable device, each rotation device configured to allow the second end of the corresponding adjustable device to rotate about three degrees of freedom with respect to each first end of the corresponding adjustable device.

14. The mount according to claim 13, wherein the rotation device comprises a substantially spherical bearing, and at least one of the first, second or third adjustment device comprises a linear translational device.

15. The mount according to claim 13, wherein each of the first adjustable device, second adjustable device and third adjustable device comprise a biasing device to provide a biasing force to the corresponding rotation device to reduce backlash on the mount.

16. The mount according to claim 15, wherein the biasing device comprises a spring.

17. The mount according to claim 13, wherein the mount is for adjusting the mounting plane of a head up display in a vehicle, and each first end is configured to be mounted to the vehicle.

18. A vehicle comprising the mount of claim 13.

19. A mount for adjusting a mounting plane, the mount comprising:

a first adjustable device, a second adjustable device and a third adjustable device, a first connection between the first adjustable device and the second adjustable device forming a first principal axis, and a second connection between the second adjustable device and the third adjustable device forming a second principal axis substantially perpendicular to the first principal axis;

the second adjustable device being rigidly coupled to one or both the first adjustable device and third adjustable device;

the first adjustable device configurable to be adjusted in a first translational degree of freedom, and substantially constrain the first adjustable device in remaining translational degrees of freedom, wherein adjustment of the first adjustable device in the first translational degree of freedom causes a rotation of the mounting plane about the second principal axis;

the second adjustable device configurable to be adjusted in a second translational degree of freedom, and substantially constrain the second adjustable device in remaining translational degrees of freedom, wherein adjustment of the second adjustable device in the second translational degree of freedom causes a rotation of the mounting plane about a third principal axis, substantially perpendicular to the first and second principal axis;

the third adjustable device configurable to be adjusted substantially in the first translational degree of freedom, and substantially constrain the third adjustable device in remaining translational degrees of freedom, wherein adjustment of the third adjustable device in the first translational degree of freedom causes a rotation of the mounting plane about the first principal axis;

a first end of each adjustable device configured to be fixed in location and a second end forming the mounting plane;

each of the first adjustable device, second adjustable device and third adjustable device comprise a biasing device and a rotation device, each rotation device located between the first end and the second end of the corresponding adjustable device, each rotation device configured to allow the second end of the corresponding adjustable device to rotate about three degrees of freedom with respect to each first end of the corresponding adjustable device, the biasing device to provide a biasing force to the corresponding rotation device.

20. An aircraft comprising: the mount of claim 19; and a display coupled to or providing the mounting plane.

\* \* \* \* \*